United States Patent [19]

Scholz et al.

[11] 4,104,667

[45] Aug. 1, 1978

[54] MOUNTING MEANS FOR BLADES OF PHOTOGRAPHIC SHUTTERS

[75] Inventors: Erwin Scholz; Albert Ehlers, both of Brunswick, Fed. Rep. of Germany

[73] Assignee: Rollei-Werke Franke & Heidecke, Brunswick, Fed. Rep. of Germany

[21] Appl. No.: 774,685

[22] Filed: Mar. 7, 1977

[30] Foreign Application Priority Data

Mar. 12, 1976 [DE] Fed. Rep. of Germany ....... 2610350

[51] Int. Cl.² .............................................. G03B 9/10
[52] U.S. Cl. ................................................ 354/250
[58] Field of Search ............... 354/226, 246, 248–250, 354/261, 265; 416/221; 24/217 W, 739 F; 16/168, 169

[56] References Cited

U.S. PATENT DOCUMENTS

| | | | |
|---|---|---|---|
| 1,166,921 | 1/1916 | McPhee | 354/265 |
| 2,041,850 | 5/1936 | Melick | 16/168 X |
| 2,380,568 | 7/1945 | Adams | 24/217 W X |
| 3,596,867 | 8/1971 | Allander | 24/217 W X |
| 3,810,223 | 5/1974 | Kitai et al. | 354/250 |

FOREIGN PATENT DOCUMENTS 782,464 9/1957 United Kingdom ...................... 16/169

Primary Examiner—Donald A. Griffin
Attorney, Agent, or Firm—Stonebraker, Shepard & Stephens

[57] ABSTRACT

A thin metallic blade or leaf of a photographic shutter, especially a shutter of the slit or focal plane type, is riveted to a trunnion which fits snugly but rotatably in an opening in a mounting plate. The trunnion has a circumferential groove intermediate its length, and the end of the trunnion remote from the shutter blade is of truncated conical shape. On the rear side of the mounting plate (the side remote from the shutter blade) there is a longitudinal groove extending tangent to the trunnion. A retaining wire in the longitudinal groove engages the circumferential groove in the trunnion, to retain the trunnion against being pulled axially out of its bearing opening in the mounting plate. In one form of the invention, the longitudinal groove for receiving the retaining wire is approximately twice the width of the retaining wire, and the wire is resilient and is held, at a distance from the trunnion, against the side of the wire groove which is toward the trunnion. The resilient wire may be sprung away from the trunnion to release the trunnion when the shutter blade is to be removed. When the shutter blade is being mounted on the plate, the frusto-conical end of the trunnion thrust the resilient wire aside and the wire snaps into the circumferential groove in the trunnion when the trunnion is fully seated in its bearing hole. In another embodiment, the groove for the retaining wire is only approximately the same width as the diameter of the wire, and the wire is moved longitudinally along its groove to engage in the circumferential groove of the trunnion or to disengage therefrom.

9 Claims, 4 Drawing Figures

MOUNTING MEANS FOR BLADES OF PHOTOGRAPHIC SHUTTERS

BACKGROUND OF THE INVENTION

Many types of photographic shutters employ very thin metal plates which may be referred to as blades or leaves or lamellae, mounted for movement to open and then to close the exposure opening or light entrance opening of the photographic shutter. The present invention relates to the mounting of such blades, and is particularly useful in what are called slit shutters or focal plane shutters, although the utility of the invention is not limited to shutters of this kind.

Whatever the type of shutter, it is important that the blades or lamellae be mounted for easy low-friction movement in an accurately defined path of travel. Close tolerances are required, so that the respective blades may move very close to each other, without actually hitting or rubbing against each other.

The present invention relates only to the manner in which the blades are pivotally mounted on a mounting member or mounting plate. The other details of the shutter construction are unimportant so far as the present invention is concerned, and may be widely varied within the skill of the art. Thus the present disclosure is limited to the means for pivotally mounting a shutter blade on a mounting plate, and no attempt is made to illustrate or describe the other features of the shutter, which may be conventional and well known in the art.

An object of the invention is to provide an improved mounting for a shutter blade, which will enable the blade to be quickly installed in the shutter, in an accurate manner so that the blade will operate properly with the desired close tolerance.

Another object is the provision of such mounting means which is also designed so that the blade may be quickly removed when required.

DESCRIPTION OF THE PREFERRED EMBODIMENTS

Figure 1:
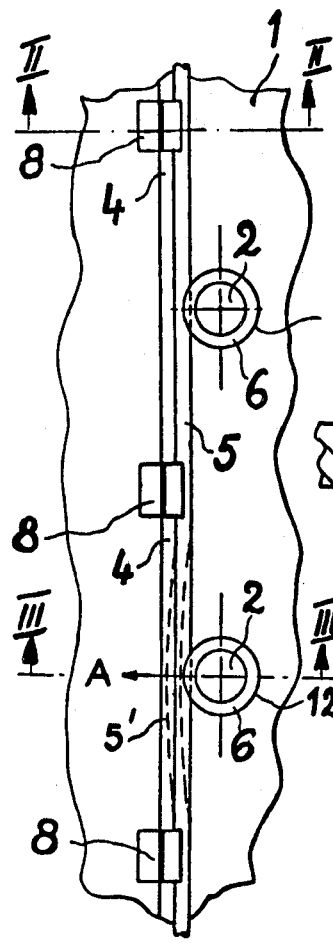
FIG. 1 is a fragmentary top plan view of a portion of a shutter blade mounting member illustrating two trunnions for two shutter blades and the retaining wire for retaining the trunnions in place, and the groove for receiving the retaining wire.

Referring now to the drawings, the shutter includes a stationary mounting member in the form of a plate or bar 1. This member 1 serves as a carrier for the mounting of several shutter blades or laminae of the shutter, such for example as a slit shutter, which may be conventional except for the manner in which the blades are mounted on the mounting member 1. A typical blade is fragmentarily shown at 3.

Each blade has a trunnion or bearing pivot 2 firmly riveted to it as indicated schematically at 11. The blade or lamella is made of a very thin special metal sheet, often only 5/100ths of a millimeter in thickness.

Figure 3:
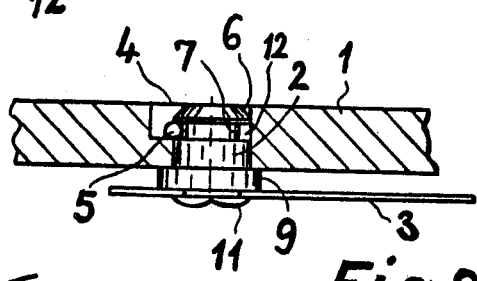
FIG. 3 is a section taken substantially on the line III—III of FIG. 1.
Figure 4:
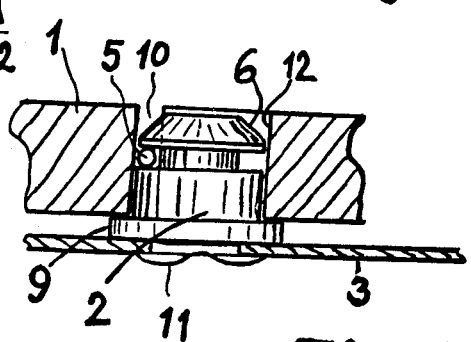
FIG. 4 is a view similar to FIG. 3, illustrating a modified form of the invention.

Each trunnion or bearing member 2, as best seen in FIGS. 3 and 4, has a shank extending axially in a direction perpendicular to the plane of the blade 3, the shank terminating in a frusto-conical end 6. At an intermediate point in the length of the shank of the trunnion 2, there is a circumferential groove 7. The shank of the trunnion 2 fits snugly but rotatably in a bearing opening or hole 12 bored through the mounting plate 1. An enlarged portion 9 of the trunnion, next to the blade 3, forms a shoulder which bears against the adjacent surface of the mounting plate 1, serving to space the blade 3 at a predetermined distance from the adjacent surface of the plate 1. If two adjacent blades 3 are to swing in planes slightly offset from each other so that they can overlap without striking each other, the enlarged spacing portion 9 on one trunnion can be of greater thickness, in a direction axially of the trunnion, from the corresponding portion on another trunnion, so that the respective blades will swing in slightly different planes.

For retaining the trunnions 2 in their respective bearings 12, there is a retaining wire 5 which is retained in a groove 4 extending longitudinally in the rear surface (that is, the surface remote from the blade 3) of the plate 1, the retaining wire extending approximately tangentially with respect to each trunnion to be retained thereby, and entering the annular or circumferential groove 7 of the trunnion. In a shutter of the slit or focal plane type, the retaining wire 5 will normally be tangent to two or more trunnions, the same wire serving for retaining a plurality of trunnions. In other types of shutter, where the trunnions are differently arranged rather than two or more in a straight line, there might be a separate retaining wire for each trunnion.

The depth of the groove 4, and the diameter of the retaining wire 5, are so chosen with respect to the length of the shank of the trunnion 2 and the location of the groove 7 thereof, that the wire when engaged in the circumferential groove of the trunnion will hold the trunnion snugly in position in its bearing hole 12, without appreciable axial play, but with enough looseness so that the trunnion may turn easily in its bearing hole 12, to swing the blade 3 in the required manner, without an undue amount of friction.

Figure 2:
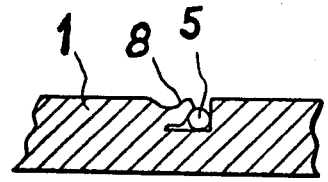
FIG. 2 is a transverse section taken substantially on the line II—II of FIG. 1.

In a first form of the invention, as illustrated in FIGS. 1-3, the groove 4 for holding the wire 5 has a width approximately twice the diameter of the wire. The wire is resilient or springy, and is normally retained against the side of the groove which is closest to the trunnions, by suitable retaining means spaced along the length of the groove at some distance from the trunnions. For example, when one wire serves a plurality of trunnions, the retaining means is preferably spaced midway between two adjacent trunnions, as indicated at 8 in FIG. 1. The retaining means is preferably in the form of a deformed portion of the metal of the plate 1, formed by pressure of a tool, in what is often referred to as a staking operation. This is well illustrated in FIG. 2, which shows how the metal is deformed from the edge of the plate 1 remote from the trunnions 2, to stake the wire 5 against the side of its groove 4 which is adjacent to the trunnions.

In this form of the invention, the blades are very easily and quickly mounted, simply by thrusting the trunnion 2 (with the blade 3 previously riveted thereto) into its bearing hole 12. The frusto-conical end 6, as it passes into the hole 12, displaces the resilient wire 5 to one side, and as the motion continues, the wire 5 snaps back into place, in the circumferential groove 7. If it is necessary for any reason to remove the blade, a tool is inserted in the groove 4 and the resilient wire 5 is pried aside in the vicinity of the trunnion which is to be removed, until it occupies a position such as shown in dotted lines at 5' in FIG. 1. This removes the retaining wire from the circumferential groove of the trunnion, and the trunnion can now be moved axially out of its bearing hole 12.

An alternative form of the invention is illustrated in FIG. 4. Here, the longitudinal groove for the retaining wire is shown at 10, and is not a wide groove like the groove 4 in FIGS. 1–3, but is a narrow groove, just accommodating the diameter of the retaining wire 5.

In this form of the invention, the wire is not present in the groove when the trunnion is to be inserted or to be removed. After the trunnion is inserted, the retaining wire 5 is then inserted longitudinally in its groove, through either end of the groove 10. If it is necessary to remove a blade, the retaining wire is pulled longitudinally out of either end of its groove 10, far enough to free the trunnion which is to be removed. In this form of the invention, when the wire is in a narrow groove rather than a wide groove, it is not necessary for the wire to be resilient or springy, although it is permissible to have it resilient or springy if preferred.

In both disclosed forms of the invention, it is comparatively easy to mount the respective shutter blades initially on the supporting or mounting plate 1 in an accurate manner with close tolerances, and comparatively easy to dismount or remove one or more of the blades or lamellae whenever repairs are required.

What is claimed is:

1. Mounting means for mounting photographic shutter blades swingably on a mounting member, said mounting means comprising means forming a plurality of bearing holes in said member, a trunnion secured to a shutter blade and rotatably received in each of said holes, each of said trunnions having a circumferential groove intermediate its length, a wire retaining groove in said mounting member, said wire retaining groove extending approximately tangentially with respect to all of said holes, and a single retaining wire extending along said wire retaining groove and engaged in the respective circumferential grooves of all of said trunnions to retain said trunnions against withdrawal from their respective holes.

2. The invention of claim 1, wherein said wire retaining groove has a width at least double the diameter of said retaining wire, and means for holding said retaining wire against that side of said wire retaining groove which is closer to the center of a hole receiving one of said trunnions.

3. The invention of claim 2, wherein said retaining wire is resilient, and wherein said means for holding said retaining wire engages said wire at points sufficiently spaced from said one trunnion so that said wire in the vicinity of said trunnion may be sprung away from the trunnion toward the opposite side of said wire retaining groove, to release the wire from said circumferential groove and permit withdrawal of said trunnion from said hole.

4. The invention of claim 3, wherein the end of said one trunnion remote from said shutter blade is formed with an inclination such that when said trunnion is inserted in its hole, said end of the trunnion will displace said resilient retaining wire laterally until the circumferential groove of the trunnion comes opposite the retaining wire, whereupon the retaining wire will snap into the circumferential groove.

5. The invention of claim 2, wherein said means for holding said retaining wire comprises a deformed portion of a side wall of said wire retaining groove to stake said wire in said groove.

6. The invention of claim 1, wherein said wire retaining groove has a width corresponding approximately to the diameter of said wire, and said wire is engaged and disengaged from said circumferential grooves of all of said trunnions by moving said wire longitudinally along its wire retaining groove.

7. The invention of claim 1, wherein at least one trunnion is rigidly riveted to said shutter blade.

8. The invention of claim 1, wherein the end of at least one trunnion remote from said shutter blade is of frusto-conical shape.

9. The invention of claim 1, wherein at least one trunnion has means forming a shoulder engaging one surface of said mounting member to limit the extent to which said trunnion may be inserted in said hole, and wherein said wire retaining groove is formed in an opposite surface of said mounting member.

* * * * *